May 9, 1950

C. B. ALBRIGHT 2,506,760

DRYING AND CURING APPARATUS

Filed March 24, 1949

INVENTOR
CHARLES B. ALBRIGHT
BY
Toulmin & Toulmin
ATTORNEYS

May 9, 1950     C. B. ALBRIGHT     2,506,760
DRYING AND CURING APPARATUS
Filed March 24, 1949     5 Sheets-Sheet 2

INVENTOR
CHARLES B. ALBRIGHT
BY
Toulmin & Toulmin
ATTORNEYS

May 9, 1950          C. B. ALBRIGHT          2,506,760
DRYING AND CURING APPARATUS Filed March 24, 1949          5 Sheets-Sheet 4

INVENTOR
CHARLES B. ALBRIGHT
BY
Toulmin & Toulmin
ATTORNEYS

Patented May 9, 1950

2,506,760

UNITED STATES PATENT OFFICE 2,506,760

DRYING AND CURING APPARATUS

Charles B. Albright, New York, N. Y., assignor to Orr Felt and Blanket Company, Piqua, Ohio, a corporation of Ohio Application March 24, 1949, Serial No. 83,163

5 Claims. (Cl. 34—45)

This invention relates to apparatus for processing felts, that is, endless wool belts, that are adapted for use particularly on paper-making machines, but which can be applied to other uses.

In using felts, or endless belts, upon papermaking machines and other types of machines, it is a more or less universal experience that the felts have a relatively short life, this being particularly true of felts manufactured from pure wools. The shortness of life of the felts is due to various factors such as mechanical wear or chemical or bacterial action upon the felts.

It has been found, however, that by applying certain resins to the felts after they have been manufactured, and properly curing the resin within the body of the felt, that the life of the felt is greatly increased. However, the proper drying and curing of the resins on the felts has involved a problem because the size of the felts varies greatly, depending upon their particular use and particular machines. The felts can be as large as 25 feet wide and 225 feet long.

Also, to cure the resins in the body of the felt, it is necessary that elevated temperatures be used for this purpose and a large volume of air be circulated around and through the felt while it is being cured so as to obtain the desired temperature rise of the resin and to drive off volatile materials.

It has been found that the melamine resins such as the alkylated melamine-formaldehyde resins are especially advantageous in prolonging the life of the felts. However, to properly dry the felt after it has been saturated by a solution of the melamine resin, it is necessary that the body of the felt be elevated to a temperature above 200° F., averaging around 250° F., and when the felt has been dried to a predetermined degree of dryness, the resin will be cured at the same elevated temperature or the temperature may be increased to as much as 400° F. It is desired that the amount of resin retained in the felt shall be approximately 5% of the dry weight of the felt, considering the normal moisture content of the felt of approximately 12%.

It has also been found that other resins of similar character can be used in treating the felts for the purpose of increasing their resistance to abrasion and resistance to chemical and bacterial action. In all instances, however, it is found to be preferable to use the resins in a water solution in which the felt can be placed for saturation thereof by the solution of the resin. After the felt is thoroughly saturated, it is removed from the resin solution and a portion of the solution is centrifuged from the body of the felt to reduce the overall quantity of resin solution retained in the body of the felt to a point that when the felt is dry, the retained resin will represent approximately 5% of the dry weight of the felt. After the felt has passed through the centrifuging operation, or solution eliminating operation, the felt is then to be dried at elevated temperatures to reduce the moisture content of the felt to a sufficiently low point that the resin retained in the body of the felt can be cured for permanent retention within the body of the felt. This curing operation is also required to be carried forward at elevated temperature to complete the polymerization or condensation of the resin.

It is therefore an object of this invention to provide apparatus for drying and curing a resin within a felt or endless fabric belt in a continuous process, and also to carry forward the process automatically under full automatic control of the various factors involved in drying and curing a felt.

It is another object of the invention to provide an apparatus in accordance with the foregoing object wherein the continuous process of drying and curing the resin in a felt is carried forward by intermittent stages both during the drying and curing operations.

It is still another object of the invention to provide an apparatus for drying and curing a felt or endless fabric belt by intermittently causing the felt or belt to be brought into an atmosphere of high temperature to drive excess liquid from the felt to dry the same and to continue the process of intermittently placing the felt into an atmosphere of high temperature for subsequently curing resin retained within the body of the felt immediately upon the body of the felt reaching a predetermined degree of dryness.

Another object of the invention is to provide an apparatus for drying and curing a felt wherein the felt contains a high moisture content and is dried to a predetermined moisture content and automatically placed upon a cycle for curing the resin in the felt.

It is still another object of the invention to provide an apparatus in accordance with the foregoing object wherein the drying of the felts and the curing of the resin therein is obtained by the use of high temperature circulating air that is impinged upon and conducted through the body of the felt to obtain a uniform drying action upon the felt and a uniform curing action upon the resin in the felt.

Still another object of the invention is to provide an apparatus for drying a felt and for curing the resin therein by applying high temperature circulating air to the felt wherein a certain percentage of air of low moisture content is continuously admitted into the air circulating system and an equal percentage of air of a high moisture content is continuously exhausted from the air circulating system, and also wherein the percentage of air admitted to the system and exhausted therefrom is proportioned according to the temperature of atmospheric air and its ability to pick up moisture.

Another object of the invention is to provide a fully automatic control system for accomplishing the drying of a felt and of curing the resin therein set forth in the foregoing objects.

It is still another object of the invention to provide an improved mechanism for accomplishing the foregoing objects.

Further objects and advantages will become apparent from the drawings and the following description.

Figure 1:
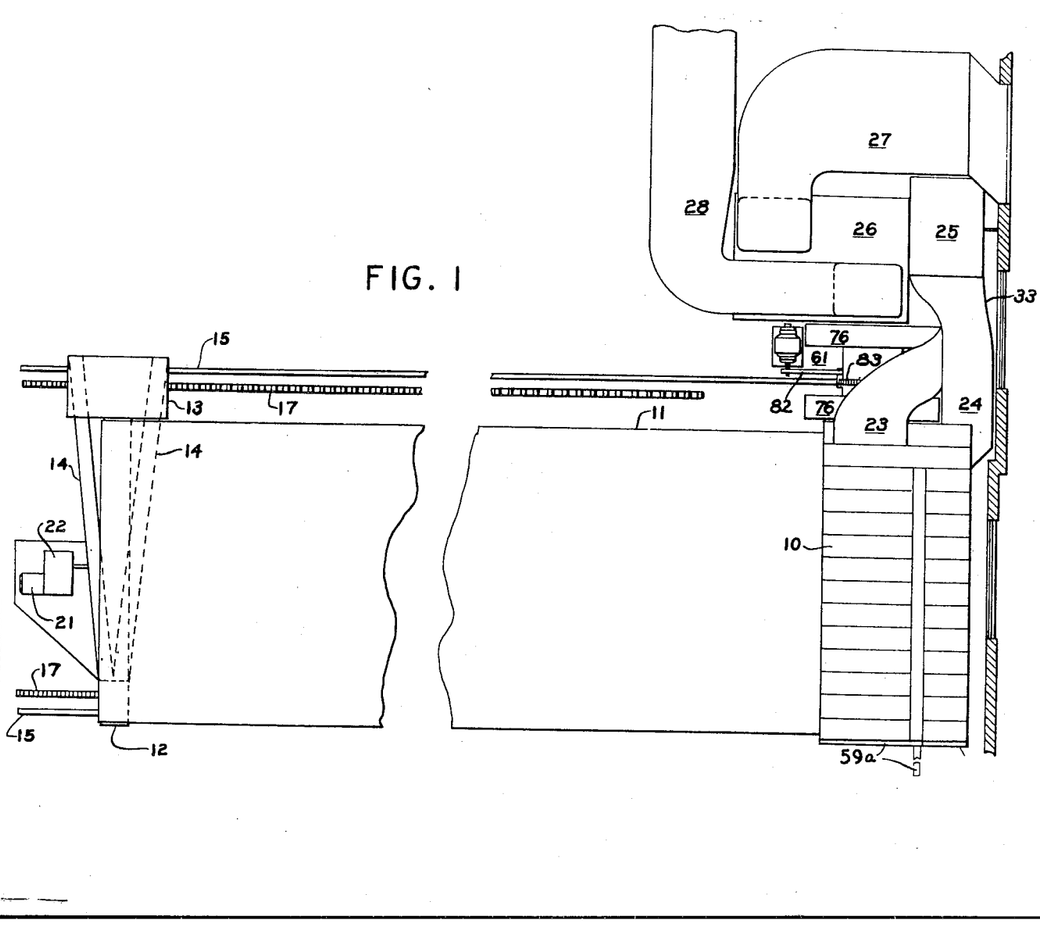
Figure 1 is an elevational plan view of the general arrangement of the apparatus of this invention.
Figure 6:
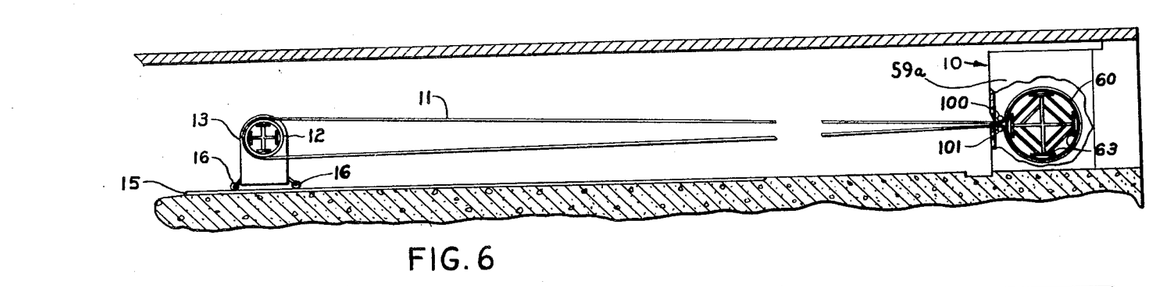
Figure 6 is a vertical cross-sectional view of the general arrangement of the apparatus.

The general arrangement of the apparatus of this invention is illustrated in Figures 1 and 6. The apparatus consists of a drying and curing chamber 10 through which the felt or endless belt 11 passes for drying thereof and for curing a resin therein. The endless belt 11 is stretched between a drum provided within the chamber 10, and hereinafter described, and a roll or drum 12 carried in cantilever fashion from a bearing structure 13 that is supported upon the frame members 14 extending between the tracks 15. The frame structure 14 carries suitable wheels that ride upon the tracks 15 to allow for movement of the roll 12 toward or away from the heating and curing chamber 10, as determined by the length of a belt or felt 11 to be treated.

To move the frame structure or members 14 upon the tracks 15, gear racks are provided parallel to the tracks 15. These racks 17 are engaged by driving pinions that are driven by an electric motor 21 through a gear reducing mechanism 22.

Figure 5:
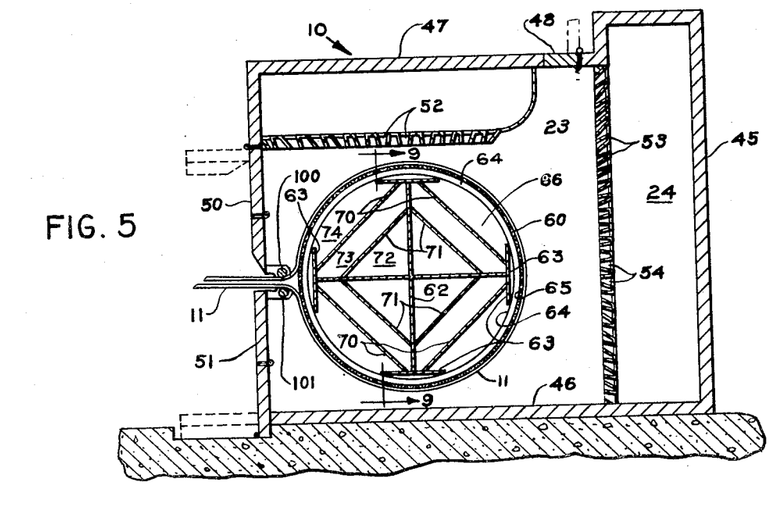
Figure 5 is a vertical cross-sectional view of the drying and curing chamber of the apparatus.

The heating and curing chamber 10 is supplied with conditioned air at elevated temperature through the inlet ducts 23 and 24, the inlet duct 23 entering the upper portion of the drying and curing chamber 10, as illustrated in Figure 5 and the inlet duct 24 entering the drying and curing chamber along a side wall thereof and forming the side wall, as illustrated in Figure 5. The supply ducts 23 and 24 are supplied with conditioned air under pressure from a fan 25 which is preferably of the squirrel-cage type for discharging air under pressure into the ducts 23 and 24. The fan 25 receives its inlet air from a mixing chamber 26 that has an inlet duct 27 extending to a point exterior of the building in which the apparatus is stationed for the purpose of providing outdoor air to the mixing chamber 26.

The mixing chamber 26 is also provided with an exhaust duct 28 that extends to a point exteriorly of the building in which the apparatus is assembled to discharge air from the mixing chamber 26. The mixing chamber 26 is also connected to the drying and curing chamber 10 through the hollow interior of the drum mounted therein, in a manner hereinafter described, to allow the fan 25 to draw air from the chamber 10 into the mixing chamber 26 which is on the suction side of the fan 25.

The fan 25 is connected to any suitable power source such as the motor 25a for driving the same.

Figure 2:
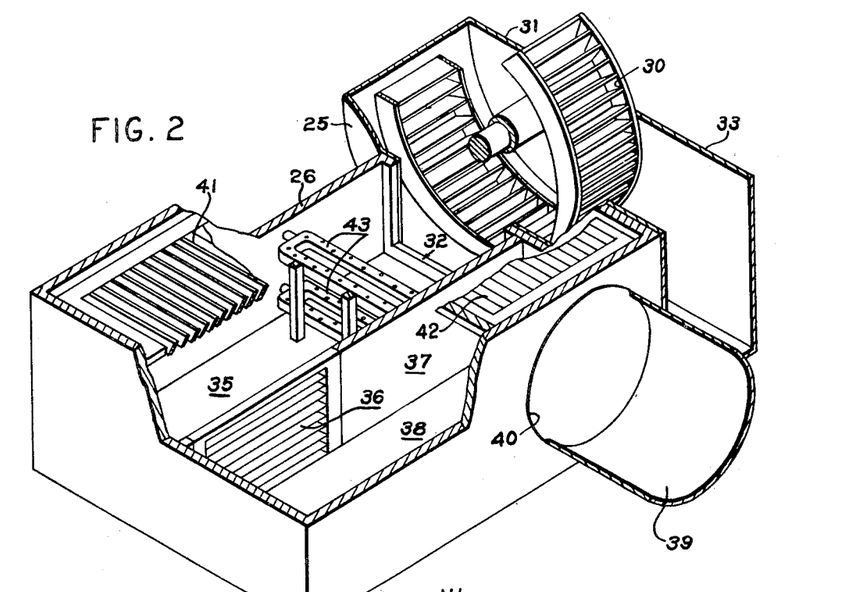
Figure 2 is a somewhat schematic cross-sectional perspective view of the chambers arranged for circulation of the conditioned air through the system and for admixture of fresh air and exhaust of spent air from the system.

As more specifically shown in Figure 2, the fan 25 consists of a squirrel-cage rotor 30 positioned within a scroll-type housing 31 having a side inlet 32 and a discharge duct 33, which discharge duct 33 becomes the duct 24 and the branch duct 23. The inlet opening 32 communicates with the chamber 35 of the mixing chamber 26. The chamber 35 has an inlet opening controlled by a set of controllable louvers 36 disposed in the partition wall 37 between the chamber 35 and the chamber 38.

The chamber 38 communicates with the interior of the roll or drum mounted within the drying and curing chamber 10 through means of a duct 39 connected with the chamber 38 through the opening 40.

The chamber 35 is also provided with a second inlet opening controlled by a set of controllable louvers 41 that are placed in the inlet duct 27 for regulating the quantity of outdoor air admitted into the chamber 35 for admixture with the air re-circulated in the system through the controllable louvers 36.

The chamber 38 is provided with an outlet opening that has a set of controllable louvers 42 therein, and which are positioned in the exhaust duct 28 to regulate the amount of air exhausted from the air circulating system. The louvers or dampers 41, 36 and 42 are automatically controlled to vary the amount of air re-circulated in the system, the amount of outdoor air admitted to the system, the amount of air discharged from the system, and for controlling the air circulating system to provide for circulation of all outdoor air through the system with no re-circulation.

The chamber 35 is provided with a plurality of heating units for heating the air passing to the fan 25. The heating units 43 may be of any suitable type, either electric or gas, but in the present instance are gas heaters automatically controlled to regulate the temperature of the air delivered by the fan 25 through the ducts 23 and 24 into the drying and curing chamber 10.

Figure 4:
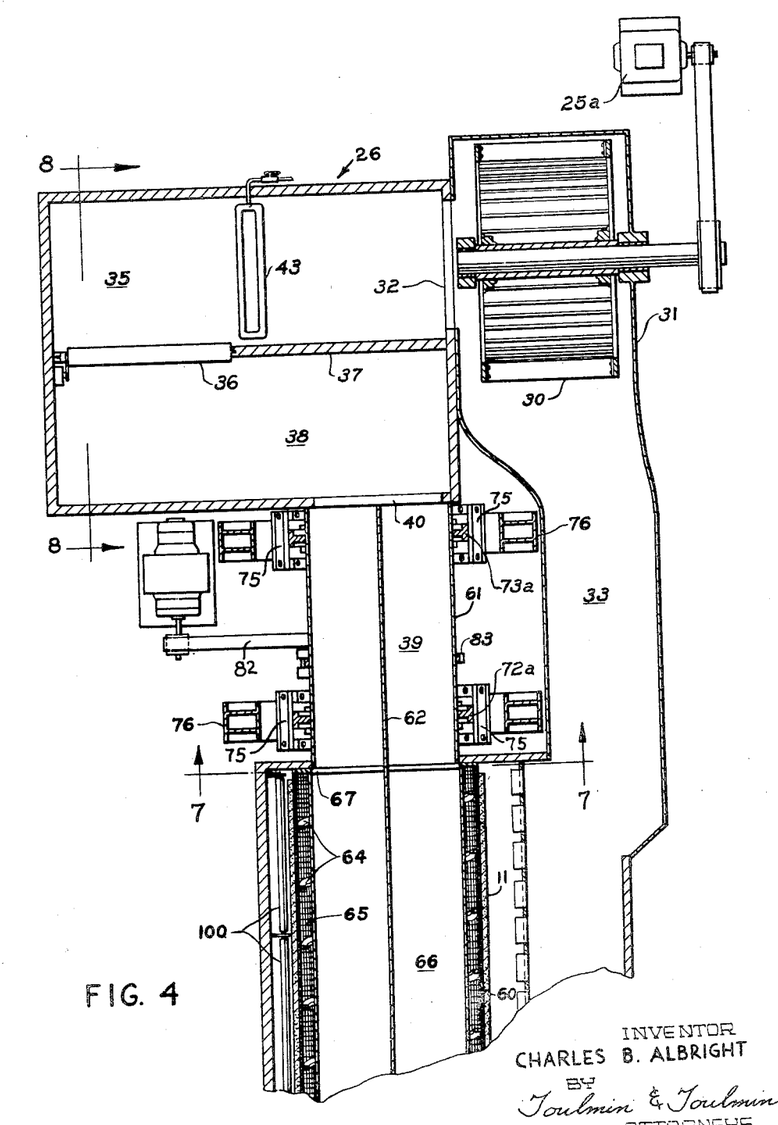
Figure 4 is a horizontal cross-sectional view taken through the air circulating chambers of the apparatus and showing the mounting for the drum adapted to carry the felt or endless fabric belt through the drying and curing chamber of the apparatus.

The drying and curing chamber 10, and the drying and curing drum contained therein is more specifically illustrated in Figures 4 and 5. The drying and curing chamber 10 comprises a rear wall 45 that is stationary with respect to the bottom wall 46 and a stationary top wall 47 that has an access door 48 therein extending longitudinally of the chamber 10. The front wall is composed of two movable sections 50 and 51 that may be hinged into the positions indicated in dotted lines to open the front wall in front of the drying and curing drum 60 positioned within the chamber 10.

The inlet duct 23 is disposed adjacent the upper wall 47 of the chamber 10 and the inlet duct 24 discharges adjacent the rear wall 45 of the chamber 10. The duct 23 has a series of jet openings 52 therein that extend along the length of the drum 60 so that air from the duct 23 will be impinged downwardly upon the felt 11 passing over the drum 60. The front wall 53 of the duct 24 is also provided with a series of jet openings 54 that cause air to be impinged horizontally upon the felt 11 carried by the drum 60. The large volume of air under pressure exhausted through the jet openings 52 and 54 causes an internal circulation of air within the chamber 10 to such an extent that six to ten times the amount of air is moved within the chamber 10 as is actually delivered through the jet openings 52 and 54. The large volume of air thus moved in the chamber 10 provides for a rapid removal of moisture from the felt or fabric belt 11.

The curing drum 60 consists of a bearing drum 61 that has secured therein a cross-shaped member 62. The cross-shaped member 62 extends through the bearing drum 61, and has plate members secured thereon at right angles to the cross member 62. The members 63 extend longitudinally along the member 62 from the bearing drum 61 to the end of the member 62. The plate members 63 support a spirally wound metal strip 64 that extends from end to end of the plates 63. The spirally wound strip 64 supports a wire frame or drum 65. This wire frame or drum 65 supports the felt 11 as carried over the curing drum 60 and allows for passage of air from within the chamber 10 through the felt 11 into the interior 66 of the drum 60. The metal plates 67 close opposite ends of the frame 65 so that all of the air entering the interior of the drum 60 must pass through the screen frame 65.

The bearing drum 61 communicates with the duct 39 in the mixing chamber 26 for return of air from the drying and curing chamber 10 to the mixing chamber 26.

To insure a uniform movement of air through the screen frame 65 of the drum 60 throughout its entire length, there is provided a series of baffles arranged within the interior 66 of the drum 60. An outer series of baffles 70 are secured to the plates 63 and form substantially a closed rectangular structure therein that extends substantially one-third the length of the drum 60. A second series of baffles 71 are secured to the cross-frame structure 62 and further divide the interior of the drum into additional chambers. This latter series of baffles 71 extend substantially two-thirds the length of the drum 60. The arrangement of the baffles just mentioned, therefore, provides for three separate chambers 72, 73 and 74 through which return air moves toward the mixing chamber 26 and insures a relatively uniform movement of air through the screen frame 65 throughout the length of the drum 60.

The drying and curing drum 60 is carried in cantilever fashion by the bearing rings 72a and 73a supported by roller bearings that are carried upon a frame 76.

The drying and curing drum 60 is rotated by an electric motor that drives a gear through a belt connection 82. The gear in turn drives a ring gear 83 secured to the bearing drum 61 between the bearing rings 72a and 73a thereon.

The bearing structure 13 that carries the drum 12, previously described, is of the same general type as disclosed with reference to the bearing structure that supports the drying and curing drum 60.

In general, the operation of the apparatus is that when a papermakers' felt or an endless fabric belt is to be placed upon the apparatus for the purpose of drying the same and curing a resin contained in the body of the belt, the air circulating system is inactive upon rendering the fan inactive. The drum 12 is moved toward the drum 60 a sufficient distance to allow for placement of the desired length of belt or felt between the drums 12 and 60. At this time the heating units in the mixing chamber 26 are inactive.

An endless felt or belt 11 will have been previously processed to saturate the felt with a solution of a resin that is to be cured within the body of the felt. The prior preparation of the felt for the drying and curing operation may be in any desired manner since this invention is directed particularly to only the drying of the felt and the curing of the resin therein.

When the felt 11 has been placed upon the drums 12 and 60, the drum 12 is moved away from the drum 60 by operation of the motor 21, see Figure 1, until the slack in the felt 11 between drums 12 and 60 is taken up. The drying and curing chamber 10 is then closed by placing the partition walls of the chamber in the full-line position indicated in Figure 5 and by closing of an end door which was previously opened to gain access to the drum 60. The idler rolls 100 and 131 are engaged by the felt 11 at the opening provided between the sections 50 and 51 of the chamber 10.

The fan 25 is then started in operation and the louvers 41 and 42 are opened wide and the louver 36 closed to cause circulation of all outdoor air through the drying and curing chamber 10 and be discharged through the exhaust duct 28 to thereby purge the entire air circulating system of any gases that may have accumulated therein.

The heating units 43 are then rendered active to heat the air to a predetermined temperature as controlled automatically in a manner hereinafter described. Any elevated temperature desired may be maintained, depending upon the resin to be cured and the materials in the felt. The drum 60 is rotated by the motor 80 so that the heated air discharged from the ducts 23 and 24 into the interior of the chamber 10 will impinge upon and pass through the felt 11 to drive moisture or volatile matter therefrom into the interior of the drum 60, the spent air passing out of the interior of the drum 60 through the duct 39 into the mixing chamber 26. At this time the louvre 36 is fully open and the louvers 41 and 42 are partially open to thereby obtain recirculation of air through the fan 25 and obtain an admission of a predetermined volume of outdoor air into the mixing chamber and an exhaust of a predetermined quantity of spent air through the exhaust duct 28. If the continuous length belt 11 is of a width less than the length of the drum 60, a fabric strip can be placed around the drum at the edges of the belt in extreme cases to prevent by-passing of any major portion of the air around the fabric belt.

The drum 60 rotating slowly carries the felt or endless fabric belt 11 through the drying and curing chamber 10 a plurality of times before the felt is dried to a point at which curing of the resin in the felt can start. It is preferable to dry the endless felt by intermittent stages rather than endeavoring to dry the same by one passage thereof through the drying and curing chamber because lower elevated temperatures can be used for this purpose and the danger of charring the felt or fabric belt is avoided.

As the drying operation of the felt proceeds, the moisture content of the felt gradually drops until the moisture content is approximately 4 or 5% of the dry weight of the felt, at which time it is considered that curing of the resin begins. The intermittent heating of the felt is then continued by continuing the intermittent passage of the portions of the felt through the drying and curing chamber for a predetermined period of time until it is determined that the resin is cured throughout the area of the belt.

The curing of the resin in the felt by intermittent stages is a preferable method since it will avoid any possible over-curing of local areas in the felt which may result from a re-entry of the initially cured portion of the felt when it returns to the drying and curing chamber, should the operation be endeavored to be carried forward by a single passage of the felt through the drying and curing chamber.

After the heat has been applied to the felt for the predetermined curing time, the heating units are rendered inactive and the dampers 41 and 42 are fully opened and the damper 36 closed to allow for circulation of all outdoor air through the heating and curing chamber 10 for the purpose of quickly purging the chamber of heated air and thereby avoid over-curing of any local portion of the felt 11. Upon completion of the purging of the chamber 10 of heated air, the louvers 41 and 42 may again be re-set at their proportioning positions and the louver 36 opened to again allow recirculation of air through the mixing chamber. When the system is in this condition, humidification can be supplied to the circulating air to return the felt or endless fabric belt to its normal moisture content, which averages approximately 12% of the dry weight of the felt.

After the humidification process has been completed, the drying and curing chamber can be opened and the felt removed from the drums 12 and 60.

Figure 3:
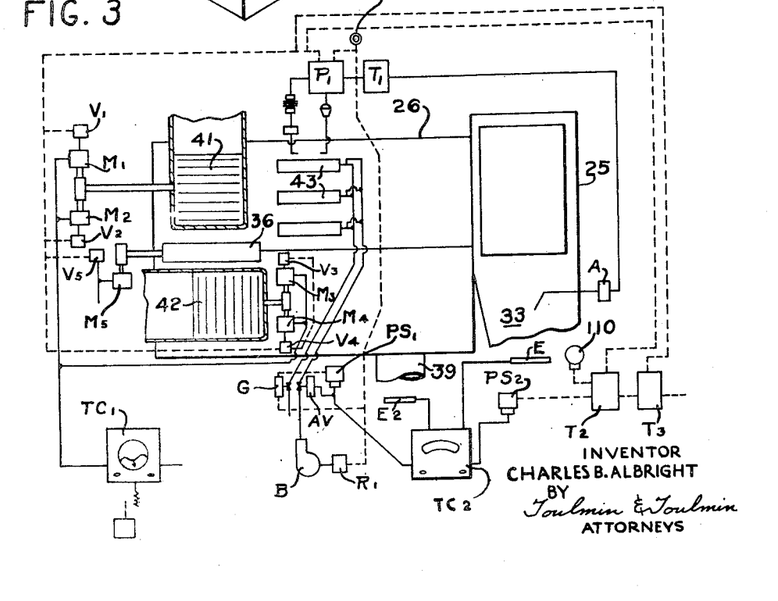
Figure 3 is a schematic illustration of a fully automatic control system controlling the apparatus of this invention.
Figure 7:
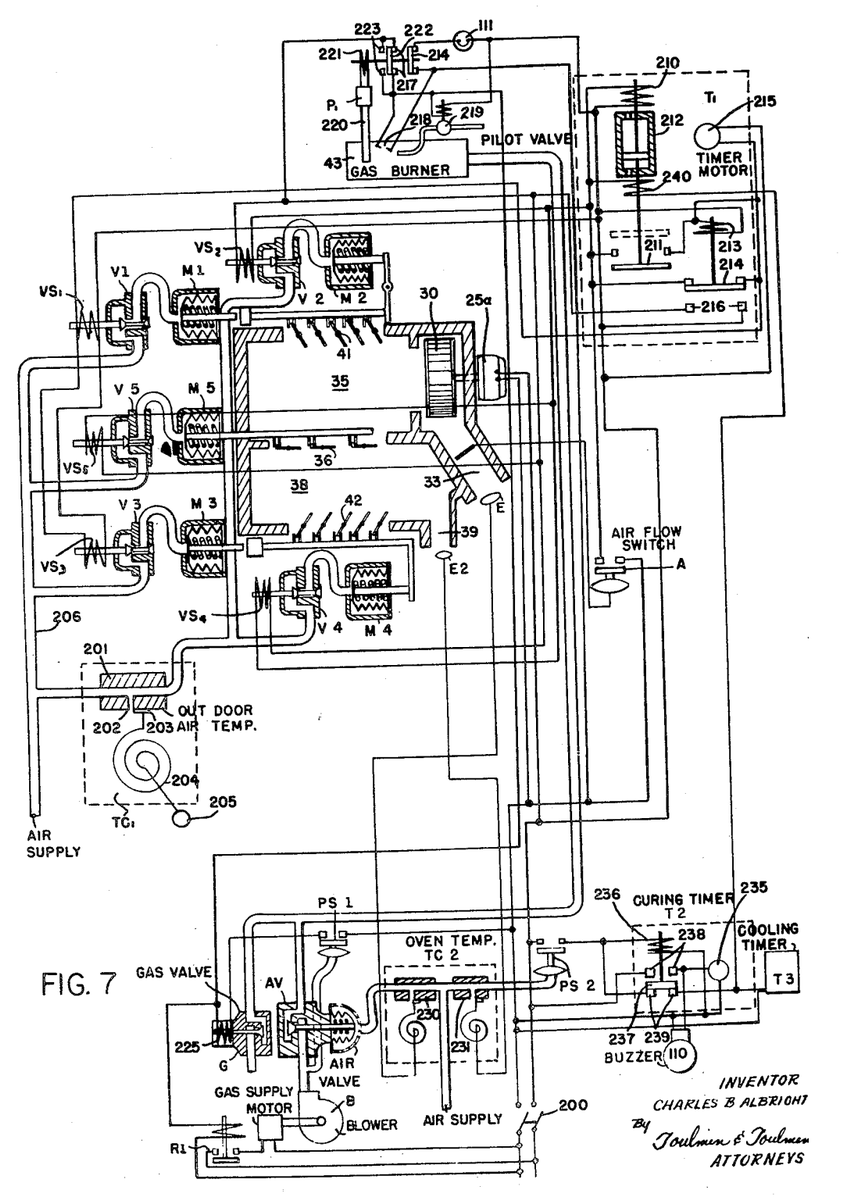
Figure 7 is a schematic illustration of the automatic control system illustrated in Figure 3 but including in more detail various operational elements of the system.

A control system for automatically controlling the complete cycle of operation of the apparatus hereinbefore described is diagrammatically or schematically illustrated in Figures 3 and 7. The instrument controls referred to herein are of a type known as air-actuated controls, and specifically, the individual controls are manufactured by the Minneapolis-Honeywell Regulator Company, Brown Instruments Division, and are standard controls of this company. Therefore, the functioning of the various controls will be described with reference to the automatic control of the apparatus described herein without reference to the details of the mechanism of the controls since the mechanisms of the controls are not a part of the subject matter of this invention, but the particular functions which they produce in controlling the apparatus of this invention do constitute a part of the method of control of the apparatus for performing the method of drying and curing felts or endless belts in accordance with this invention.

The controls referred to are a combination of air-actuated units and electrical units which are operated in response to the operation of the air-actuated units. Hence, there is provided a main electrical controller 200 that is provided for energizing the power circuit for the instruments and also energizes the fan 25 to start the same. This particular electrical controller is shown in Figure 7 as a conventional mechanical controller for maintaining a closed circuit.

The controls for the apparatus consist of an air flow switch A that is actuated when the fan 25 is in operation and air circulated through the air circulating system hereinbefore described. Operation of the air flow switch A effects actuation of a purging timer $T_1$ which controls the period of time through which air is circulated through the drying and curing chamber 10 prior to the beginning of the heating cycle. The purging timer $T_1$ subsequently effects operation of a flame failure safety controller $P_1$ for igniting the gas heating units 43 referred to hereinbefore. The flame failure safety controller $P_1$ insures ignition of the burners before actuation of any subsequent controls.

The louvers or dampers 41 are actuated by air operated damper motors $M_1$ and $M_2$ for controlling opening and closing thereof while corresponding damper motors $M_3$ and $M_4$ actuate the louvers 42. A damper motor $M_5$ is provided for controlling opening and closing of the louvers 36.

The damper motors $M_1$, $M_2$, $M_3$ and $M_4$ are controlled by an outdoor temperature controller $TC_1$ to regulate the position of the dampers 41 and 42 and proportion the amount of outdoor air admitted to the mixing chamber 26 and the amount of air exhausted from the mixing chamber 26 in proportion to the temperature of the outdoor air, and thus its ability to pick up moisture. In general, the amount of outside air used will vary from 17% at an outdoor temperature of 0° F. to approximately 27% at an outdoor temperature of 95° F.

The damper motors $M_1$, $M_2$, $M_3$, $M_4$ and $M_5$ are also actuated by suitable pressure electric switches $V_1$, $V_2$, $V_3$, $V_4$ and $V_5$, respectively, to open and close the dampers 41, 42 and 36, respectively, in response to operation of the purging timer $T_1$, the curing timer $T_2$ and the cooling timer $T_3$ to shift the position of the dampers in accordance with the requirements for full flow of outdoor air through the air circulating system or for recirculation with proportioned inlet of outdoor air and exhaust of spent air. The curing timer $T_2$ regulates the period of the curing cycle referred to heretofore and the cooling timer $T_3$ regulates the period of purging of the drying and cooling chamber after the curing cycle.

The gas burners 43 receive their gas supply under control of the gas valve G which is under control of the flame failure safety controller $P_1$ so that if the flame failure safety controller $P_1$ is satisfied, the gas valve G will remain open, otherwise it will close. The air supply for the burners 43 is supplied by the blower B through the air supply control valve AV which is regulated by the temperature controller $TC_2$ having one thermal element E thereof responsive to the temperature of the air supplied to the duct 33 for automatically controlling the temperature of the heated air by regulating the quantity of air supplied with the gas to the burners 43. A pressure switch $PS_1$ is also provided for controlling the gas valve G, and is responsive to the pressure of the air delivered through the valve AV so that when the air delivered through the valve AV is at or below one-third of the capacity thereof, the pressure switch will close the gas valve G. This is a safety feature in that the gas burners will not perform satisfactorily when air below a predetermined volume is delivered with the gas.

The temperature controller TC₂ is provided with a second thermal element E₂ responsive to the temperature of the air in the discharge duct 39 that actuates a second element of the temperature controller TC₂ that when the temperature of the element E₂ is a few degrees below the temperature of the element E, the pressure switch PS₂ influenced by the temperature controller TC₂ will energize the timer T₂ to start the timing of the curing cycle and will ring the buzzer 110 to indicate that the curing cycle has started.

A signal light 111 is provided for indicating when the flame failure safety controller P₁ is not functioning, and the burners 43 are not ignited, the signal light being adapted to be turned on when the burners fail to ignite.

The operation of the control system heretofore referred to will be more particularly described with reference to Figure 7. In this figure the outdoor temperature controller TC₁ includes an air control valve 201 that has an exhaust 202 that may be closed by a valve 203 operated by a Bourdon tube 204 actuated by a thermal element 205. The air pressure to the air control valves V₁, V₂, V₃, V₄, and V₅ is thus under control of the outdoor temperature controller TC₁ to vary the pressure in the air line 206 and thereby adjust the setting of the dampers 41, 36, and 42 in accordance with outdoor temperature conditions.

The air valves V₁, V₂, V₃, V₄, and V₅ are also electrically operated by means of electric solenoids VS₁, VS₂, VS₃, VS₄, and VS₅.

In the operation of the control system, the operator of the apparatus closes the main starter 200 for energizing the instrument power circuit and the motor 25a for the fan 25. With the fan 25 operating and air circulating through the air circulating system, the air flow switch A, which is a pressure operated switch actuating in response to the air flowing through the air circulating system, will be actuated to close the circuit to the purging timer T₁ to begin timing of a purging operation before the heating cycle is started. Operation of the air flow switch A closes an electric circuit to the solenoid 210 in the purging timer T₁ to actuate the contactor 211 and move the same upwardly slowly under control of a damper 212. As the contactor moves in its upward direction the electric circuit is closed to the solenoid 213 which actuates the contactor 214 which establishes a holding circuit for the coil 213.

Closing of the contactor 214 establishes an electric circuit to the solenoids VS₁ and VS₃ of the air valves V₁ and V₃ to close the same and thereby apply air pressure onto the air motors M₁ and M₃ to cause them to set the dampers 41 and 42 in their full open position for all outdoor air intake into the mixing chamber 26 and exhaust of all air through the exhaust duct 28. At this time air valve V₅ is opened to exhaust air from the air motor M₅ to permit the spring therein to close dampers 36. An electric circuit will also have been established through the signal light 111 indicating that the burners 43 are not ignited, this circuit having been established through the contactor 214. When the timing motor 215 times out, the contactor 214 will be moved from its upper position, the holding circuit through the coil 213 being broken thereby so that an electric circuit will then be established for causing operation of the flame failure safety control P₁ to ignite the burners 43. When a circuit is made through the contacts 216 by closing of the contactor 214 thereon, an electric circuit is established through the contacts 217 to the electric igniter 218 for the burner 43 and to an electrically operated pilot valve 219 that supplies gas for a pilot flame over the burner 43. Ignition of the pilot flame will cause the flame electrode 220 to establish an electric circuit in the coil 221 and thereby actuate the contactor 222 to open circuit through contacts 217 and close circuit through contacts 223, thereby establishing an electric circuit through the solenoid 225 of the gas valve G to open the same for supply of main supply of gas to the burner 43.

With the contactor 214 closed on contacts 216, air valves V₁ and V₃ will be open to exhaust air motors M₁ and M₃, thereby rendering them inactive. However, solenoids VS₂, VS₄, and VS₅ of the air valves V₂, V₄, and V₅ will be actuated to close the air valves and thereby cause air pressure to be applied on the air motors M₂, M₄, and M₅ to open dampers 41, 43, and 36. These dampers will be under control of the outdoor temperature controller TC₁ to set them at the correct proportion of opening as heretofore described.

When the flame failure safety device P₁ is energized, the gas valve G will be opened as heretofore described and blower B is rendered active through closing of the relay R₁ for supplying air to the burners 43. If the flame failure safety device is not satisfied by the burners 43 after a predetermined period of time, the main gas valve G and the blower B will be stopped, since the flame electrode 220 will permit the contactor 222 to return to its initial position, as illustrated on the drawing. If the blower B should fail to start, the pressure switch PS₁ will not close and thereby prevent opening of the gas valve G.

If the flame failure safety device is satisfied upon ignition of the burners 43 the element of the temperature controller TC₂ actuated by the thermal element E will regulate the air control valve AV to proportion the air supplied to the burners 43 automatically and control the temperature of the heated air delivered through supply duct 33 to a predetermined temperature. This is occasioned by the bleed valve 230 to regulate the supply of air on the air actuated air valve AV.

Automatic control of the air temperature in the supply duct 33 continues until the second control element of the temperature controller TC₂, as actuated by the thermal element E₂ in the return duct 39 reaches a temperature approximating that of the control element E, that is a few degrees below the temperature of the control element E, thereby indicating that the felt 11 on the drum 60 has been dried to a moisture content of approximately four to five percent of the dry weight of the felt. The second control element has a bleed valve 231 which also regulates the pressure in the air line to the air actuated valve AV. When both bleed valves 230 and 231 are closed, the pressure switch PS₂ will close an electric circuit to the curing timer T₂ and thereby energize the coil 236 to move the contactor 237 upwardly onto the contacts 238. This operation starts the running of the timing motor 235 and closes an electric circuit to the buzzer 110 indicating that the curing cycle has started. When the curing timer $T_2$ times out, as controlled by timer motor 235, the contactor 237 will be moved to its lower position to close contacts 239 to initiate the cooling timer $T_3$. Concurrently, an electric circuit is made to the coil 240 of the timer $T_1$ to cause the contactor 211 to move downwardly and thereby again energize coil 213 and move contactor 214 to its upper position. This operation breaks the electric circuit to the flame failure safety device $P_1$, thereby breaking the circuit to the gas valve G and the blower B. Also, the air valves $V_1$ and $V_3$ are again actuated to set the dampers 41 and 42 in their full open position, and permit the dampers 36 to be set in their closed position for circulation of outdoor air through the air circulating system for cooling cycle.

When the cooling timer $T_3$ times out the control system is deenergized by opening the main controller 200 whereupon the drying or curing chamber 10 may be opened and the felt or endless belt removed therefrom.

However, if it is desired to rehumidify the felt up to its normal moisture content of approximately 12% of the dry weight of the felt, the cooling timer $T_3$ can control the damper motors for the respective dampers to again open the re-circulating air damper 36 and to reset the proportioning dampers 41 and 42 to their proportioning positions and concurrently initiate a humidification cycle through a humidifying device. Upon a moisture-sensitive device indicating a moisture content of the felt at a desired level, the moisture-sensitive device can actuate suitable controls to stop functioning of the control system.

This application is a continuation-in-part application of my copending application Serial No. 654,697 filed March 15, 1946.

Having thus fully described my invention, what I claim as new and desire to secure by Letters Patent is:

1. In a system for conditioning air for drying a fabric strip, a fan for circulating conditioned air, an air mixing chamber communicating with the inlet side of said fan, means for conducting air from said fan and for returning the air delivered thereby to the mixing chamber, independently operated damper means in said mixing chamber to allow for inlet of outside air thereto and exhaust of circulating air therefrom, other damper means in said mixing chamber to allow for re-circulation of air between the fan through the mixing chamber when open and to cut off the said re-circulation of air when closed, heating means in said mixing chamber for heating air before delivery into said fan, means for individually controlling each of said aforesaid damper means, timing means rendered active by air movement caused by said fan for actuating said damper control means to set said damper means for intake of all outdoor air and exhaust of all air circulated by said fan, means rendered active upon running of time of said timer for rendering active said heating means and for controlling said damper control means to set said dampers for re-circulation of air, and thermal control means responsive to the temperature of the air delivered by the fan for controlling said heating means.

2. In a system for conditioning air for drying a fabric strip, a fan for circulating conditioned air an air mixing chamber communicating with the inlet side of said fan, means for conducting air from said fan and for returning the air delivered thereby to the mixing chamber, independently operated damper means in said mixing chamber to allow for inlet of outside air thereto and exhaust of circulating air therefrom, other damper means in said mixing chamber to allow for re-circulation of air between the fan through the mixing chamber when open and to cut off the said re-circulation of air when closed, heating means in said mixing chamber for heating air before delivery into said fan, means for individually controlling each of said aforesaid damper means, timing means rendered active by air movement caused by said fan for actuating said damper control means to set said damper means for intake of all outdoor air and exhaust of all air circulated by said fan, means rendered active upon running of time of said timer for rendering active said heating means and for controlling said damper control means to set said dampers for re-circulation of air, thermal control means responsive to the temperature of the air delivered by the fan for controlling said heating means, and a second thermal control means responsive to the temperature of the air returning to said mixing chamber for rendering active a timer when the temperature of the second thermal control means approaches the temperature of the first thermal control means.

3. In a system for conditioning air for drying a fabric strip, a fan for circulating conditioned air, an air mixing chamber communicating with the inlet side of said fan, means for conducting air from said fan and for returning the air delivered thereby to the mixing chamber, independently operated damper means in said mixing chamber to allow for inlet of outside air thereto and exhaust of circulating air therefrom, other damper means in said mixing chamber to allow for re-circulation of air between the fan through the mixing chamber when open and to cut off the said re-circulation of air when closed, heating means in said mixing chamber for heating air before delivery into said fan, means for individually controlling each of said aforesaid damper means, timing means rendered active by air movement caused by said fan for actuating said damper control means to set said damper means for intake of all outdoor air and exhaust of all air circulated by said fan, means rendered active upon running of time of said timer for rendering active said heating means and for controlling said damper control means to set said dampers for re-circulation of air, thermal control means responsive to the temperature of the air delivered by the fan for controlling said heating means, a second thermal control means responsive to the temperature of the air returning to said mixing chamber for rendering active a timer when the temperature of the second thermal control means approaches the temperature of the first thermal control means, and means responsive to outdoor temperature for controlling said damper control means for intake and exhaust of air to and from said mixing chamber to proportion the quantity of outdoor air admitted into said mixing chamber and the quantity of air exhausted from the mixing chamber in response to outdoor temperature.

4. In a system for conditioning air for drying a fabric strip, a fan for circulating conditioned air, an air mixing chamber communicating with the inlet side of said fan, means for conducting air from said fan and for returning the air delivered thereby to the mixing chamber, independently operated damper means in said mixing chamber to allow for inlet of outside air thereto and exhaust of circulating air therefrom, other damper means in said mixing chamber to allow for re-circulation of air between the fan through the mixing chamber when open and to cut off the said re-circulation of air when closed, heating means in said mixing chamber for heating air before delivery into said fan, means for individually controlling each of said aforesaid damper means, timing means rendered active by air movement caused by said fan for actuating said damper control means to set said damper means for intake of all outdoor air and exhaust of all air circulated by said fan means rendered active upon running of time of said timer for rendering active said heating means and for controlling said damper control means to set said dampers for re-circulation of air, thermal control means responsive to the temperature of the air delivered by the fan for controlling said heating means, a second thermal control means responsive to the temperature of the air returning to said mixing chamber for rendering active a timer when the temperature of the second thermal control means approaches the temperature of the first thermal control means, means responsive to outdoor temperature for controlling said damper control means for intake and exhaust of air to and from said mixing chamber to proportion the quantity of outdoor air admitted into said mixing chamber and the quantity of air exhausted from the mixing chamber in response to outdoor temperature, and a third timer rendered active upon running of time of said second timer for causing actuation of said damper control means to set the dampers for intake of all outdoor air into the mixing chamber and exhaust of all air from the mixing chamber as circulated by the fan.

5. In a system for conditioning air for drying a fabric strip, a fan for circulating conditioned air, an air mixing chamber communicating with the inlet side of said fan, means for conducting air from said fan and for returning the air delivered thereby to the mixing chamber, independently operated damper means in said mixing chamber to allow for inlet of outside air thereto and exhaust of circulating air therefrom, other damper means in said mixing chamber to allow for re-circulation of air between the fan through the mixing chamber when open and to cut off the said re-circulation of air when closed, heating means in said mixing chamber for heating air before delivery into said fan, means for individually controlling each of said aforesaid damper means, timing means rendered active by air movement caused by said fan for actuating said damper control means to set said damper means for intake of all outdoor air and exhaust of all air circulated by said fan, means rendered active upon running of time of said timer for rendering active said heating means and for controlling said damper control means to set said dampers for re-circulation of air, thermal control means responsive to the temperature of the air delivered by the fan for controlling said heating means, a second thermal control means responsive to the temperature of the air returning to said mixing chamber for rendering active a timer when the temperature of the second thermal control means approaches the temperature of the first thermal control means, means responsive to outdoor temperature for controlling said damper control means for intake and exhaust of air to and from said mixing chamber to proportion the quantity of outdoor air admitted into said mixing chamber and the quantity of air exhausted from the mixing chamber in response to outdoor temperature, a third timer rendered active upon running of time of said second timer for causing actuation of said damper control means to set the dampers for intake of all outdoor air into the mixing chamber and exhaust of all air from the mixing chamber as circulated by the fan, and means rendered active upon running of time of said third timer for introducing humidity into said mixing chamber to provide for moist air circulated by said fan.

CHARLES B. ALBRIGHT.

REFERENCES CITED

The following references are of record in the file of this patent:

UNITED STATES PATENTS

| Number | Name | Date |
|---|---|---|
| 1,523,509 | Braemer | Jan. 20, 1925 |
| 1,707,547 | Adams | Apr. 2, 1929 |
| 1,786,191 | Carroll | Dec. 23, 1930 |
| 1,938,625 | Engels | Dec. 12, 1933 |
| 2,040,328 | Olson | May 12, 1936 |
| 2,100,284 | Kreichbaum | Nov. 23, 1937 |
| 2,360,915 | Vermilya | Oct. 24, 1944 |
| 2,448,144 | Guthier | Aug. 31, 1948 |